United States Patent
Rautia et al.

(10) Patent No.: US 7,214,866 B2
(45) Date of Patent: May 8, 2007

(54) METHOD FOR MANUFACTURING MUSICAL INSTRUMENT AND A MUSICAL INSTRUMENT

(75) Inventors: Veijo Rautia, Joensuu (FI); Heikki Koivurova, Joensuu (FI)

(73) Assignee: Flaxwood Oy, Heinavaara (FI)

( * ) Notice: Subject to any disclaimer, the term of this patent is extended or adjusted under 35 U.S.C. 154(b) by 0 days.

(21) Appl. No.: 11/212,282

(22) Filed: Aug. 26, 2005

(65) Prior Publication Data

US 2006/0032358 A1  Feb. 16, 2006

Related U.S. Application Data

(63) Continuation of application No. PCT/FI2004/000107, filed on Feb. 27, 2004.

(30) Foreign Application Priority Data

Feb. 28, 2003  (FI) ................................ 20030310

(51) Int. Cl.
  *G10D 13/00* (2006.01)
(52) U.S. Cl. ........................................ 84/291
(58) Field of Classification Search ................. 84/267, 84/291
  See application file for complete search history.

(56) References Cited

U.S. PATENT DOCUMENTS

| 4,873,907 A | 10/1989 | Decker, Jr. et al. ........... 84/291 |
| 6,120,910 A | 9/2000 | Szenics ....................... 428/447 |
| 6,156,842 A * | 12/2000 | Hoenig et al. ............... 525/171 |
| 6,333,454 B1 * | 12/2001 | Griffiths ....................... 84/291 |
| 2003/0070528 A1 * | 4/2003 | Davis et al. ................. 84/291 |

FOREIGN PATENT DOCUMENTS

| DE | 198 52 036 A1 | 5/2000 |
| WO | WO 00/40399 | 7/2000 |
| WO | WO 01/76841 A2 | 10/2001 |

* cited by examiner

*Primary Examiner*—Kimberly Lockett
(74) *Attorney, Agent, or Firm*—Harrington & Smith, PC

(57) ABSTRACT

The present invention relates to a method for manufacturing a musical instrument, in which method a musical instrument is manufacturing for one or several parts and of which parts at least one part is manufactured of plastic material compound, which includes thermoplastic polymer. The present invention relates also to a musical instrument, which instrument has been manufactured of one or several parts and of which parts at least a part has been manufactured of plastic material compound, which includes thermoplastic polymer. Characteristic to the method in accordance with the invention is the fact that plastic material compound is made by mixing natural fibers to thermoplastic polymer and that a musical instrument or its parts are manufactured of plastic material compound by injection moulding such that the natural fibers in plastic material compound are directed mainly in certain, desired direction in respect of the musical instrument or its part while moulding. Characteristic to the musical instrument in accordance with the invention is the fact that the musical instrument or its parts have been made of thermoplastic polymer, with natural fibers mixed to it, and that in the musical instrument or part of it natural fibers have directed mainly in certain, desired direction in respect of the musical instrument or its part.

10 Claims, 1 Drawing Sheet

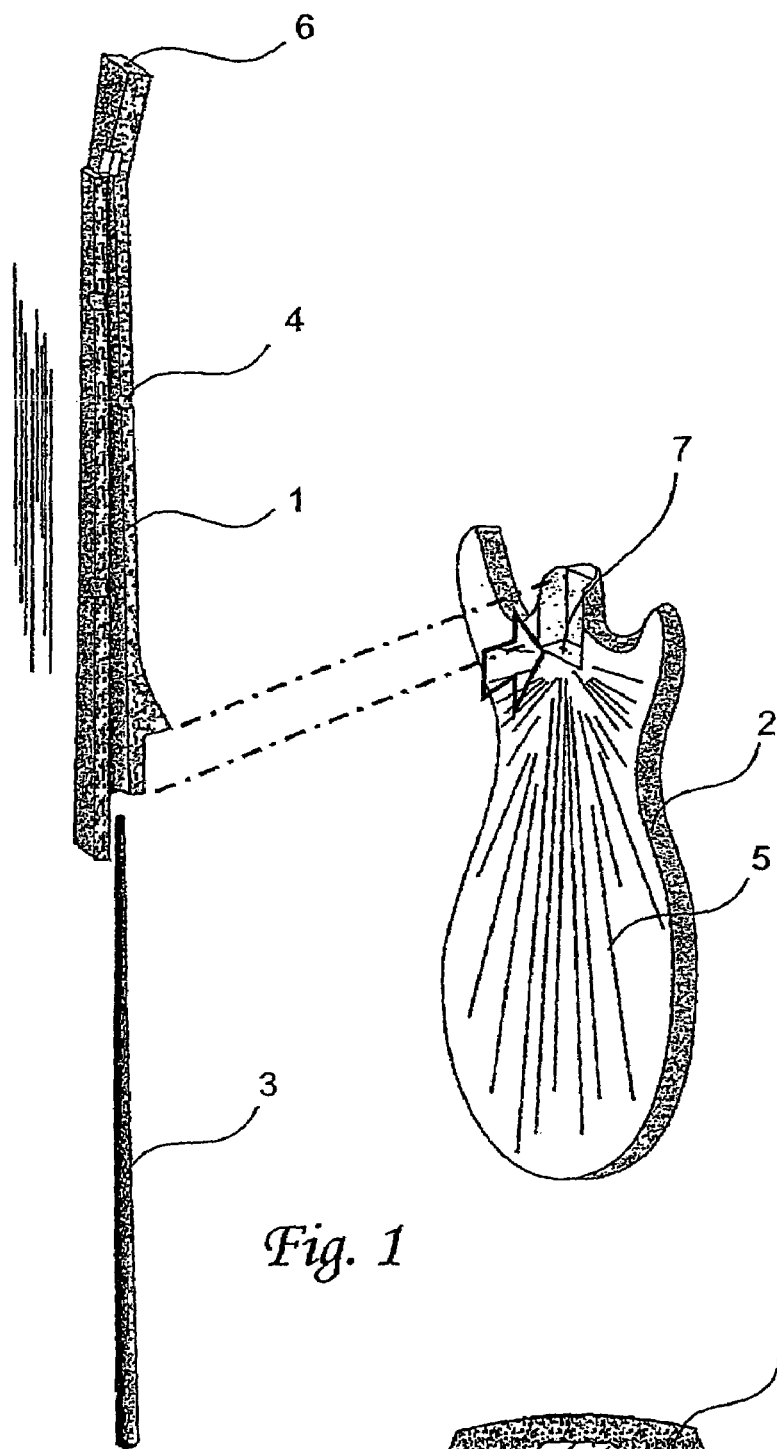
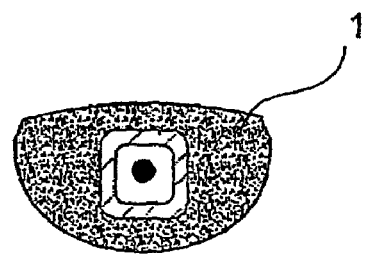
Fig. 1
Fig. 2

METHOD FOR MANUFACTURING MUSICAL INSTRUMENT AND A MUSICAL INSTRUMENT

The application is a continuation of International Patent Application No. PCT/FI2004/000107 filed on Feb. 27, 2004.

The present invention relates to a method for manufacturing a musical instrument, in which method a musical instrument is manufactured of one or several parts and of which parts at least one is manufactured of plastic material compound, which comprises thermoplastic polymer. The present invention also relates to a musical instrument, which instrument has been manufactured of one or several parts and of which parts at least a part has been manufactured of plastic material compound, which comprises thermoplastic polymer.

BACKGROUND OF THE INVENTION

Traditionally parts, which form the body of various wind instruments and guitars, are mainly made of wood. Wood is an excellent material in terms of sound engineering because wood is extremely stiff material in respect of its weight, and its vibrating properties generally please the human ear. The length of tone is suitably short while wood suitably damps the vibration.

The problem of wood is the fact that it is laborious and relatively slow to work to achieve the exact shape and degree of finishing (for example desired coarseness of the surface) required. In addition, the inconvenient influence of pores, possible resin pockets in grain structure and other invisible unevenness on the surface of wood often appear only while testing the finished instrument. In the most disadvantageous situation you may notice that the great amount of work done for manufacturing a musical instrument has been wasted and the instrument has to be rejected due to its unqualified tone.

For example, working a neck of an electric guitar is an especially laborious and skill requiring working phase, while space must be prepared for a truss rod, which functions as a counterforce against the pull of the strings inside the neck. Three alternative techniques have become common in preparing the space for a truss rod; in the first alternative the lower part of the neck is made of one object to the upper surface of which a groove is worked for a truss rod, and after mounting the truss rod, an upper part made of separate object is mounted on the lower part. In the second alternative a groove is made to the lower surface of the neck reaching above the middle point of the cross-section of the neck, which groove is plugged after mounting the truss rod by glueing a covering object of the length of the groove and of the thickness less than the depth of the groove to the groove under the neck. In the third alternative the neck is made of two halves of the neck divided horizontally in the middle, to sides, which are to be glued against each other, of which a groove has been made vertically at the same place. In all these cases, the neck parts are glued together. Glueing requires great exactness and it always worsens the tone properties of the finished neck, while the glue material remaining in the connection behaves acoustically differently than the surrounding wood.

In use, wood also encounters very annoying problems, which are due to swelling, and shrinking (so-called humidity-related dimensional changes) caused by humidity of the air. For example, the tuning state of an electric guitar may change due to the different degree of humidity and its changes at a concert region (continental climate, sea climate) even during a concert. Sometimes the humidity of the air may increase in a concert hall also, for example, due to a great number of people.

Changes due to humidity cause problems also in respect of the finishing stage, while parts experiencing no changes due to humidity must be attached to wood, for example, frets made of metal, tuning mechanisms and so on.

Especially troublesome are dimensional changes in typical enlarging direction of wood, e.g. against grains, on the neck area of an electric guitar due to humidity changes. In the neck of an electric guitar it means the same direction in which position the earlier said frets made of metal are. In case a guitar has been manufactured and finished in a damper place than the place of use is, the end of frets stick out in more dryer conditions, and may even harm the fingertips of the player.

Further, the problem with wood is, among other things, the fact that many species of wood suitable for material of musical instruments are endangered nowadays. For example, ebony and Brazilian rosewood are protected in many countries.

Problems of wood instruments have been tried to avoid by facilitating various plastic and composite manufacturing techniques. The humidity-related dimensional changes of necks have been decreased, for example, by mounting aluminium strips to the neck, manufacturing the neck of wood enforced with carbon fibre or thermoset compound enforced with carbon fibre. The humidity-related dimensional changes have also been tried to minimize with heat treatment of wood.

In addition, the body of a guitar, among other things, has been made by injection moulding of acryl (PMMA) or some other amorphous polymers, for instance. The method is excellent in terms of production, while in this way, the body part will be of extremely uniform quality and the final shape may be achieved straight without separate finishing stages.

Non-enforced plastics commonly used in injection moulding of the body of an electric guitar are acoustically not as good as wood. The duration of tone is longer, stiffness smaller and these together create a "hollow" and "mono-level" sound, which is hard to define. In addition, so called "attack", that is the sensitivity of a tone to kindle in an electric guitar with this kind of a body remains on a modest level.

Acoustic disadvantages of a body made by injection moulding have been tried to be reduced by lowering the specific weight of material with various flotation techniques. Stiffness has been tried to increase by adding various reinforcements, such as fibreglass or carbon fibre. Results from both ways have remained acoustically modest while both said reinforcements increase the specific weight of the material and lengthens the duration of tone, that is the inner dampening having influence on the duration of tone remains on a modest level.

The object of the invention is to provide a method for manufacturing a musical instrument or its parts, with the use of which the earlier said problems related to recognized manufacturing methods of musical instruments and to musical instruments manufactured by those are eliminated. Especially, the object of the invention is to provide a method, with which musical instruments or its parts may be manufactured of plastic materials such that tone, corresponding to a high quality musical instrument made of wood is achieved. In addition, the object of the invention is to provide a musical instrument manufactured with the method in accordance with the invention.

DESCRIPTION OF THE INVENTION

Characteristic to the method in accordance with the invention is that the plastic material compound is made by mixing natural fibres to thermoplastic polymer and that a musical instrument or its parts are manufactured of plastic material compound by injection moulding such that the injection points are chosen such that plastic material compound flows in the mould such that the natural fibres in plastic material compound are directed mainly in certain, desired direction in respect of the musical instrument or its part while moulding. With this kind of a method, a sufficient inner stiffness and a sufficient dampening of tone may be achieved in a musical instrument, in which case it is possible to have the musical instrument acoustically to correspond to a high quality musical instrument made of wood without slow and laborious working of material and risks connected to that. In addition, the humidity-related dimensional changes of musical instruments manufactured in this way are quite nonexistent such that problems due to humidity of the air related to wood instruments are avoided. Furthermore, in this way the manufacturing of a musical instrument or its parts will be quicker and more economical in costs than of those traditionally made, and there is no need for any glue joints in a part of the musical instrument, such as the neck of an electric guitar, for example, because the hollow points included in the part may be made by means of cores. Manufacturing with injection moulding increases also the freedom of a manufacturer to design a musical instrument or its part in a desired way without noticeable increase in manufacturing costs.

In an advantageous application of the method in accordance with the invention the injection points of an elongated part of a musical instrument, such as the neck of a guitar, are chosen such that plastic material compound flows in the mould in longitudinal direction of the part, in which case the natural fibres are directed in longitudinal direction of the part. In this way, the construction of a neck of an electric guitar, for example, is possible to create such that the vibrations of the neck are transmitted to the body such that vibrating continues from the neck to the body with as little resistance in crossing as possible.

In an advantageous application of the method in accordance with the invention the points for injection for a plate shaped part of a musical instrument, such as the body of an electric guitar are chosen such that the plastic material compound flows in the mould radially from the mould opening to other surrounding parts of the mould, in which case the natural fibres are directed radially from the mould opening to other parts of the mould. In this way the plate shaped part of a musical instrument is possible to manufacture acoustically corresponding to a part made of high quality wood, while the stiffness and the dampening properties of the part may be adjusted by changing the quantity of natural fibres and by using various fibres.

In an advantageous application of the method in accordance with the invention the plastic material compound is made by mixing 20–60 w-% of natural fibre to thermoplastic polymer. Tests performed show that with such a quantity of natural fibres it is possible to achieve acoustically optimal stiffness and dampening of a musical instrument or its part, and due to that an extremely pleasant tone.

Characteristic to the musical instrument in accordance with the invention is that the musical instrument or its parts have been made of thermoplastic polymer, with natural fibres mixed to it, and that the musical instrument or part of it have been manufactured by injection moulding such that the natural fibres have directed mainly in certain, desired direction in respect of the musical instrument or its part. The material of a musical instrument made in this way is of extremely uniform quality due to which the acoustic properties of the musical instrument are good. In a musical instrument or its part, injection moulded in this way, it is possible to have acoustically sufficient stiffness and sufficient dampening of tone such that the finished musical instrument corresponds at least to a musical instrument of high quality made of wood In addition, changes in the humidity of the air do not cause humidity-related dimensional changes and problems due to that in this kind of a musical instrument. Furthermore, in this kind of a musical instrument there are no inner glue joints in the parts, which weaken the tone of the musical instrument.

DESCRIPTION OF THE DRAWINGS

Next, the invention will be explained in more detail with reference to the accompanying drawings, in which, FIG. 1 illustrates a longitudinal cross section of the neck of an electric guitar manufactured in accordance with the method in accordance with the invention, and the body inclined from side while the neck is detached, and FIG. 2 illustrates a cross-section of the neck of an electric guitar manufactured in accordance with the method in accordance with the invention.

The electric guitar in accordance with FIGS. 1 and 2 comprises the neck 1 and the body 2 made of plastic material compound reinforced with natural fibre and a truss bar 3 to be mounted inside the neck. The electric guitar in accordance with FIGS. 1 and 2 comprises also other recognized parts of an electric guitar, which have not been illustrated in FIGS. 1 and 2. These are, for example, strings, a bridge, a tuning mechanism, pickups and a strap. They are manufactured and mounted into the electric guitar in recognized way.

The neck 1 of the electric guitar in accordance with FIGS. 1 and 2 is made of plastic material compound by injection moulding. The plastic material compound is thermoplastic polymer with natural fibre pieces mixed to it. Thermoplastic polymer may be, for example, polystyrene and the natural fibres preferably about 1–3 mm long flax fibre pieces or, for example, wood based cellulose. The neck of the electric guitar is cast to an injection moulding mould, the inside of which is of the shape of the neck illustrated in FIGS. 1 and 2. Inside the injection moulding mould giving the outer shape of the neck there is also the core 3 to be removed with the object, which core is somewhat conical by shape such that the end of the neck near the body has a greater cross-section. During the injection moulding the core is supported with mould parts 4 (taps) going through the cast object, which taps have been advantageously placed at the points of fingerboard dots typical to the musical instrument. By using such placing of the taps the openings in the neck may be covered after replacing the taps with pieces of fingerboard dots to be attached to the points of fingerboard dots.

The neck is cast, in this case, through an injection point 6 in the upper end of the neck. The injection points are openings in the mould, through which the plastic material is injected inside the mould with an injection nozzle of an injection-moulding machine. The injection point 6 has been directed such, that the plastic material compound flows as evenly as possible in the longitudinal direction of the neck. In this way it is possible to direct natural fibres longitudinally along the object, which is, while a guitar is concerned, the most advantageous direction of natural fibres. In addition, in this way it is possible to manufacture the whole neck of one cast object, in which case there will be no connecting joints in the neck having harmful influence on tone.

The injection point 7 of the plastic material compound in the body part of an electric guitar illustrated in FIG. 1 has been chosen to be placed essentially near the joint recess of the neck or in the recess at a suitable point. In that case the natural fibres 5 in the plastic material compound are possible to be directed from the casting point radially towards the edges of the object as illustrated in FIG. 1. Furthermore, in this way the mark of the injection point may be left invisible under the neck to be connected. Due to this kind of orientation of natural fibres (fibre orientation), while playing the guitar the vibration of the neck is transmitted from the neck to the body part such that the vibration continues with as small resistance of crossing as possible. Due to this, it is possible to create a pleasant tone corresponding to that of a wood instrument of high quality.

There are advantageously 20–60 weight per cent of natural fibre in the plastic material compound of the guitar. Suitable natural fibres are, for example, flax, hemp, sisal, wood-based cellulose, cellulose based regenerated fibres (viscose). In that case, there is 40–80 weight per cent thermoplastic polymer acting as bonding material. Natural fibres have been mixed to the bonding material while it is molten in the manufacturing phase of the material. The natural fibres mixed to thermoplastic polymer material are advantageously rather short (for example about 1–3 mm long) pieces of natural fibre. The most advantageous length of natural fibres may, however, vary depending on musical instrument and thermoplastic polymer acting as bonding material.

As bonding material or matrix different thermoplastic polymers, such as polystyrene, regenerated polyolefin (COC), acryl or pure polyolefin (PP) are used. Based on experiments, suitable thermoplastic polymers to act as bonding material for the neck and the body of an electric guitar are polystyrene, polylactide, cellulose acetate, cellulose propionate, cyclopropene, metallocene-polypropene or metallocene-polyolefin.

Essential in plastic material compounds used in manufacturing of a guitar is the fact that natural fibres in it are soft and their pull strength is good and that the casting temperature of thermoplastic polymer used as bonding material is preferably below 240° C., in which case natural fibres do not burn and they sustain their properties well.

Especially, the method corresponding to manufacturing technique of the neck of a guitar may be used also in other musical instruments based on sound behaviour of wood, such as, for example wind instruments made of wood. In that case, in order to create a tube-like construction of the wind instrument, it is advantageous to support the core, which is to be placed inside the object, at the openings of the wind instrument. It is possible to facilitate the method in accordance with the invention in manufacturing of pure acoustic stringed instruments such as an acoustic guitar, violin, cello, and the kantele, as well as various rhythm instruments and, for example, electrically amplified violin. Further, manufacturing of frame parts of drums is based on wood, in which case the method in accordance with the invention makes it possible to manufacture them with essentially more cost effectively.

The invention is not limited to the presented advantageous application but it can vary within the frames of the idea of the invention formed in the claims.

The invention claimed is:

1. Method for manufacturing a musical instrument, in which a musical instrument is manufactured of one or several parts and of which parts at least a part is manufactured of plastic material compound, which comprises thermoplastic polymer, plastic material compound is made by mixing natural fibres to thermoplastic polymer, said musical instrument or its parts are manufactured of said plastic material compound by injection moulding, and injection points while moulding are chosen to make the plastic material compound flow in a direction, with respect to said material instrument or said part, which corresponds to the desired direction of the natural fibres in said plastic material compound.

2. Method in accordance with claim 1, in which injection points of an elongated part of a musical instrument, such as the neck of a guitar, are chosen such that plastic material compound flows in the mould in longitudinal direction of the part, in which case the natural fibres are directed in longitudinal direction of the part.

3. Method in accordance with claim 1, in which injection points of a plate shaped part of a musical instrument, such as the body of an electric guitar are chosen such that the plastic material compound flows in the mould radially from the mould opening to other surrounding parts, in which case the natural fibres are directed radially from the mould opening to other parts of the mould.

4. Method in accordance with claim 1, in which the plastic material compound is made by mixing 20–60 weight % natural fibres to thermoplastic polymer.

5. A Musical instrument, comprised of one or several parts wherein at least one part of the musical instrument or its parts is made of thermoplastic polymer, with natural fibres mixed to it, the musical instrument or part of it have been manufactured by injection moulding; and injection points while moulding are chosen to make the plastic material compound flow in a direction, with respect to said musical instrument or said part, which corresponds to the desired direction of the natural fibres in said plastic material compound.

6. Musical instrument in accordance with claim 5, in which the elongated part of the musical instrument, such as the neck of the guitar, the natural fibres are directed mainly in longitudinal direction of the part.

7. Musical instrument in accordance with claim 5, in which in a plate shaped part of a musical instrument, such as the body of an electronic guitar, the natural fibres are directed radially from the injection point towards the other parts.

8. Musical instrument in accordance with claim 5, in which there are 20–60 weight % of natural fibres in the plastic material compound of the musical instrument or its part and 40–80 weight % of thermoplastic polymer.

9. Musical instrument in accordance with claim 5, in which the natural fibres are 1–3 mm long pieces of natural fibres.

10. Musical instrument in accordance with claim 5, in which thermoplastic polymer is polystyrene.

* * * * *